April 7, 1970 G. W. BICKEL ET AL 3,505,528
RANGE FINDER WITH RADIATION SENSITIVE MEANS BEHIND REFLECTOR
Filed Aug. 16, 1967
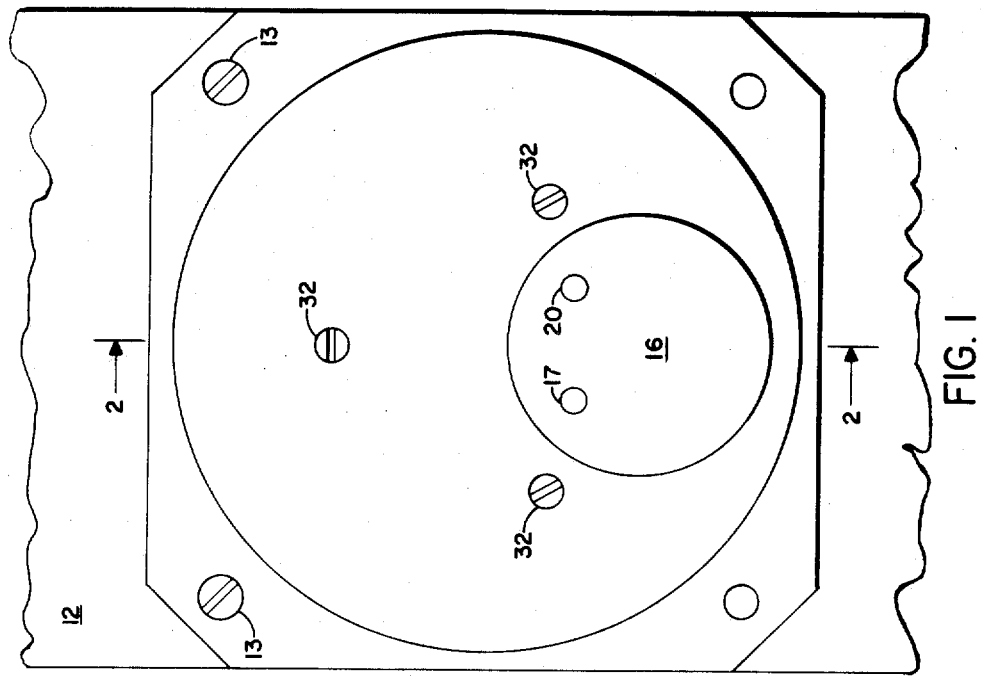
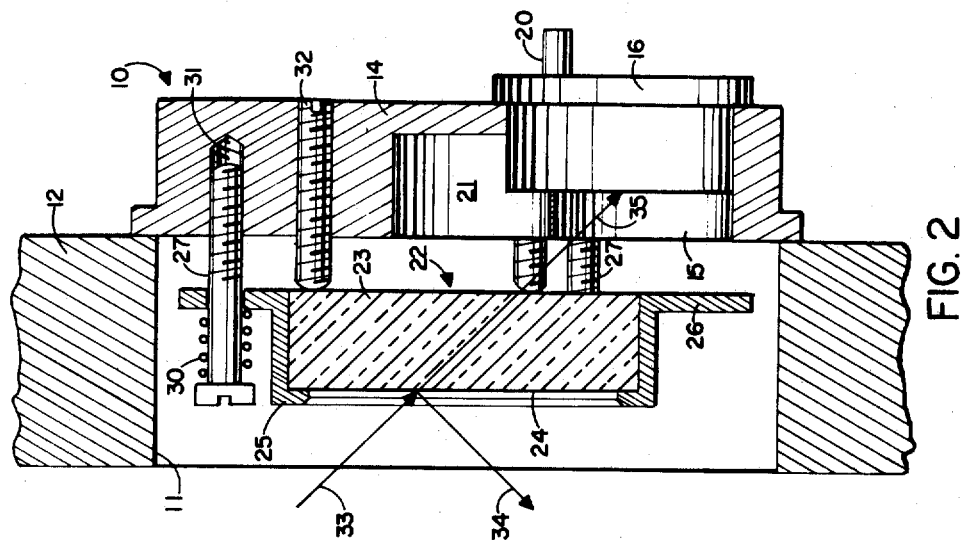
INVENTORS
GARY W. BICKEL
JOHN J. FERRARA
MARVIN L. LIPSHUTZ
BY
ATTORNEY United States Patent Office 3,505,528
Patented Apr. 7, 1970

3,505,528
RANGE FINDER WITH RADIATION SENSITIVE MEANS BEHIND REFLECTOR
Gary W. Bickel, Boston, John J. Ferrara, Acton, and Marvin L. Lipshutz, Brookline, Mass., assignors to Honeywell Inc., Minneapolis, Minn., a corporation of Delaware
Filed Aug. 16, 1967, Ser. No. 661,069
Int. Cl. H01j 5/16; H01l 15/00
U.S. Cl. 250—216     2 Claims

ABSTRACT OF THE DISCLOSURE

An integrated first-surface reflector and transducing sensor, in a kinematic mount, for use in optical systems such as laser range finders, the sensor being positioned behind the reflector to use the small amount of light unavoidably transmitted therethrough.

BACKGROUND OF THE INVENTION

This invention relates to the field of optical instruments and more expressly to laser range finders. It is frequently desirable to provide an optical instrument with means for making known the exact instant when a beam of light is received or transmitted. One method of accomplishing this has been to insert a fiber optics tap into the optical path, but this has the disadvantage of reducing the available light intensity by reducing the effective area of the beam.

SUMMARY OF THE INVENTION

Our invention may be used wherever the light path requires a reflecting surface and where the light is of suitable intensity. It comprises a photodiode mounted behind the reflecting surface, to make use of the otherwise wasted light energy transmitted through the reflecting surface, which is typically a layer of metal on the surface of a block of optical glass.

BRIEF DESCRIPTION OF THE DRAWING

In the drawing FIGURE 1 is a view enlarged of an assembly embodying the invention and FIGURE 2 is the section taken along the line 2—2 of FIGURE 1.

DESCRIPTION OF THE PREFERRED EMBODIMENT

Our invention comprises an assembly 10 mounted in an aperture 11 in the housing 12 of an optical instrument such as a laser range finder by suitable means such as screws 13. Assembly 10 includes a backing member 14 having a bore 15 to receive a photodiode 16 having terminals 17 and 20, the sensitive surface of the diode being within bore 15 which is enlarged at 21 to avoid occultation of the sensor. Diode 16 is pressed or otherwise suitably retained in bore 15.

A mirror 22 includes a block 23 of optical glass having a first reflective surface 24, and is received in a cap 25 having a flange 26 traversed by a plurality of mounting screws 27 which pass through compression springs 30 and which are received in thread bores 31 in member 14. The rear surface of block 23 is engaged by the ends of a plurality of adjusting screws 32. Screws 27 and 32 cooperate with springs 30 to comprise a kinematic mount for mirror 22.

Assembly 10 is so positioned with respect to housing 12 as to receiving a beam of light, specifically laser light, which is shown at 33, and to reflect as large a portion as possible of that light, as shown at 34. It is unavoidable that a certain minor portion of the incident light is not reflected but transmitted through surface 24, as at 35, to impinge on photodiode 16.

OPERATION

Whenever light of suitable intensity is supplied at 33, a portion thereof acts at 35 to energize diode 16, which thereafter gives an electrical output. This output can be used for any desired purpose: in one embodiment of the invention the diode signal was used as an indicator of zero time for a laser range finder, since it occurred at the instant when a laser pulse was transmitted at 34 to emerge from the output optics of the device.

In the foregoing disclosure of the invention we have set forth details and advantages of its structure and function, and the operation and the novel features thereof are pointed out in the appended claims. The disclosure, however, is illustrative only, and changes may be made within the principle of the invention, to the full extent indicated by the broad general meaning of the terms in which the appended claims are expressed.

We claim as our invention:
1. Apparatus for indicating the presence of a beam of light comprising, in combination: a mirror comprising a block of optical glass, having a plane front surface coated with metal to form a reflector, and a flanged mounting cap enclosing said block and apertured to expose said front surface reflector;
a backing member including adjustable spacing means projecting therefrom;
means securing said mirror to said backing member with the rear surface of said block in contact with said spacing means, including means traversing the flange of said cap and resiliently urging said cap toward said backing member while preventing significant lateral movement therebetween;
means for mounting said member so that said front surface reflector is positioned to reflect radiant energy impinging thereon; and
detector means comprising a photodiode mounted in said backing member to receive a portion of the radiant energy transmitted through said reflector and said block.

2. Apparatus for indicating the presence of a beam of light comprising, in combination: a mirror comprising a block of optical glass, having a plane front surface coated with metal to form a reflector and a flanged mounting cap on closing said block and apertured to expose said front surface reflector;
a backing member including adjustable spacing means projecting therefrom;
means securing said mirror to said backing member with the rear surface of said block in contact with said spacing means, including means traversing the flange of said cap and resiliently urging said cap toward a said backing member while preventing significant lateral movement therebetween;
means for mounting said member so that said front surface reflector is positioned to reflect radiant energy impinging obliquely thereon; and
detector means comprising a photodiode mounted eccentrically in said backing member to receive a portion of the radiant energy transmitted through said reflector and said block.

References Cited

UNITED STATES PATENTS

| | | | |
|---|---|---|---|
| 2,547,545 | 4/1951 | Strong | 356—209 X |
| 2,873,381 | 2/1959 | Lauroesch | 250—236 |
| 3,049,964 | 8/1962 | Miller et al. | 356—209 X |

WALTER STOLWEIN, Primary Examiner

U.S. Cl. X.R.

356—4